US011483761B2

(12) United States Patent
Zhou et al.

(10) Patent No.: US 11,483,761 B2
(45) Date of Patent: Oct. 25, 2022

(54) NETWORK SCANNING

(71) Applicant: HEWLETT PACKARD ENTERPRISE DEVELOPMENT LP, Houston, TX (US)

(72) Inventors: Qiang Zhou, Santa Clara, CA (US); Mohd Shahnawaz Siraj, Santa Clara, CA (US); Andre Beaudin, St. Laurent (CA); Xuguang Jia, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/125,929

(22) Filed: Dec. 17, 2020

(65) Prior Publication Data

US 2022/0201596 A1    Jun. 23, 2022

(51) Int. Cl.
*H04W 4/00* (2018.01)
*H04W 48/16* (2009.01)
*H04W 84/12* (2009.01)

(52) U.S. Cl.
CPC ............ *H04W 48/16* (2013.01); *H04W 84/12* (2013.01)

(58) Field of Classification Search
CPC ..... H04W 48/16; H04W 48/18; H04W 48/12; H04W 48/20; H04W 88/06; H04W 84/12; H04W 84/18; H04W 8/26; H04W 80/04
USPC .......................................... 370/338; 455/434
See application file for complete search history.

(56) References Cited

U.S. PATENT DOCUMENTS

| 10,136,339 | B2 | 11/2018 | Lee |
| 2019/0037595 | A1* | 1/2019 | Cherian ................. H04W 74/08 |
| 2019/0098565 | A1 | 3/2019 | Cherian et al. |
| 2019/0141620 | A1 | 5/2019 | Pujari et al. |
| 2019/0253968 | A1 | 8/2019 | Xiao et al. |
| 2020/0221378 | A1* | 7/2020 | Kneckt ................. H04W 48/20 |
| 2020/0229086 | A1 | 7/2020 | Monajemi et al. |
| 2020/0344677 | A1* | 10/2020 | Cherian .............. H04W 40/244 |

OTHER PUBLICATIONS

Configure RRM to Defer Off-Channel Scanning and Disable Off-Channel Monitoring, https://www.cisco.com/c/en/us/support/docs/wireless/wireless-lan-controller-software/214393-configure-rrm-to-defer-off-channel-scann.html, Website Accessed Jan. 8, 2020, 4 Pgs.
Kim, H.-S. et al., Selective Channel Scanning for Fast Handoff in Wireless LAN Using Neighbor Graph (Research Paper), The 2004 International Technical Conference on Circuits/Systems, Computers and Communications (ITC-CSCC2004), Jan. 2004, 5 Pgs.

* cited by examiner

Primary Examiner — Temica M Beamer
(74) Attorney, Agent, or Firm — Sheppard Mullin Richter & Hampton LLP

(57) ABSTRACT

Systems and methods are provided for network scanning. For example, the systems and methods can address AP scanning in the WiFi-6 context, where AP scanning frequency and the number of 6 GHz channels can be reduced. Additionally, the timing of AP scanning (on 2.4/5/6 GHz channels) can be adjusted to wait until STA's buffered frames are sent to AP and/or while a STA is asleep due to time TWT.

20 Claims, 12 Drawing Sheets

|  | 6G BSSID Channel |
|---|---|
| Neighbor AP1 | X |
| ... | ... |
| Neighbor APN | Y |

410

| 6G channel | Active 6G BSSID number |
|---|---|
| 1 | xx |
| 2 | xx |
| ... | xx |
| Y | xx |

420

| Index | 6G channel | Active 6G BSSID number | Scheduling Weight |
|---|---|---|---|
| 1 | 2 | 10 | A |
| 2 | 10 | 6 | B |
| .. | ... | xx | .. |
| N | 3 | 1 | C |

| ACI Bitmap | Delta TID | ACI High | Scaling Factor | Queue Size High | Queue Size All |
|---|---|---|---|---|---|
| 4 | 2 | 2 | 2 | 8 | 8 |

Bits:

NETWORK SCANNING

BACKGROUND

Wi-Fi is a family of wireless network protocols, based on the IEEE 802.11 standards, which are commonly used for local area networking of devices and Internet access. Several versions of Wi-Fi are available, including Wi-Fi 6E (e.g., Wi-Fi 6 Extended into the 6 GHz band), which has increased available spectrum and channels from Wi-Fi 6 for entry level access points (AP) and routers.

Some consider Wi-Fi 6E as making Wi-Fi more usable in general by increasing throughput over the prior Wi-Fi 5 and 6 with 80 MHz channels. In particular, Wi-Fi 6E adds 1,200 MHz (5925 MHz-7125 MHz) or 1.2 GHz new bandwidth with 5920-MHz channels, 2940-MHz channels, 1480-MHz channels, and 7160-MHz channels. Beside this, to support fast discovery, a Fast Initial Link Setup (FILS) Discovery frame is introduced with 20 ms interval and the minimum beacon interval can be reduced to 40 ms. With doubled channel number and a half beacon interval, the original AP Scanning method which enables scans of all valid channels becomes inefficient and hard to implement.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 show illustrative 6 GHz neighborhood BSSID tables, in accordance with embodiments of the application.

FIG. 5 illustrates a control information subfield format in a Buffer Status Report (BSR) control subfield for implementing a scheduled scan period, in accordance with embodiments of the application.

Figure 1:
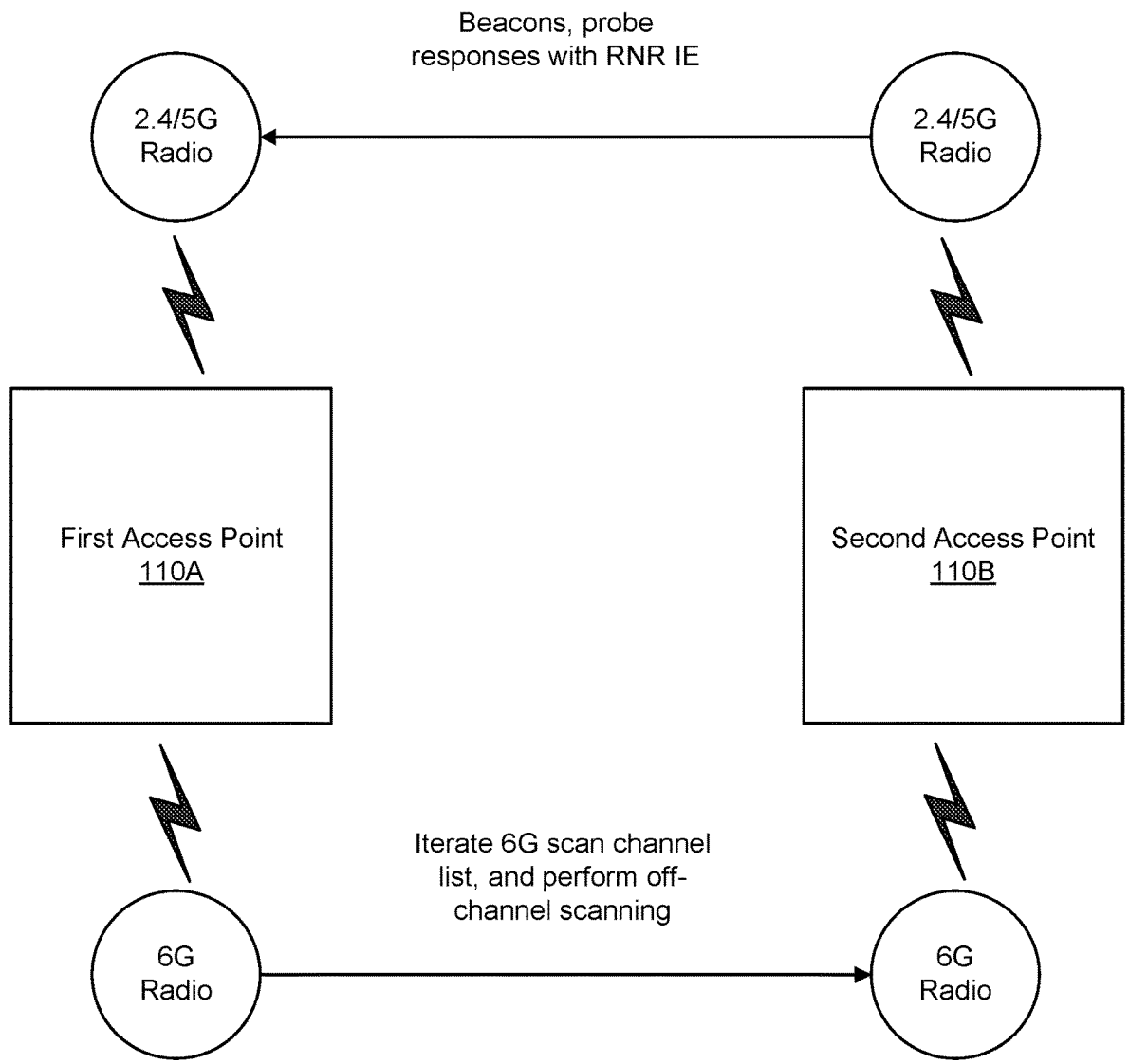
FIG. 1 illustrates an example network scanning scenario, in accordance with embodiments of the application.

The figures are not exhaustive and do not limit the present disclosure to the precise form disclosed.

DETAILED DESCRIPTION

With the approval of WiFi-6E and use of 1.2 GHz new bandwidth, Wi-Fi technology is growing faster than ever. However, moving to this new bandwidth can create some setbacks. For example, with the large number of channels in a 6 GHz band, traditional discovery methods need improvement. In these traditional methods, the AP may iterate through every channel to discover its neighbors. With the massive number of additional channels, this traditional discovery method would take a significant amount of time before the AP discovers its neighbors.

Traditional discovery methods also implement background scanning. In these methods, a client device may scan a network to connect to an AP. During normal scanning operations, a client device may scan for a suitable AP to connect to, in case it needs to roam from its current "on-channel" AP. The AP may also scan the network, e.g., for intrusion detection purposes. In these examples, the client device or the AP can scan a channel to determine which client devices or APs are also present on the channel. The AP may move off channel and leave its home channel or BSS channel where the AP serves its clients. In off-channel scanning, the client device may tune its radio to another channel to look for available APs or scanning for APs on a channel to which it is not connected (hence "off-channel").

When the AP returns on-channel, the AP may scan again. However, while the AP was scanning off-channel, the AP might have missed some data frames sent to it on its home channel. This can lead to packet loss, retries, and high channel utilization.

Traditional scanning methods may also cause the AP to miss various frames (e.g., data frames, management frames, control frames) from unassociated client devices that were sent when the AP was scanning. For example, the unassociated client may send management frames to the AP (e.g., via the other channel that the un-associated clients is trying to associate, or via the original channel, etc.). When a data frame is sent from an associated client and missed while the AP is scanning the other channel, that could cause a data loss and the STAs may retry those frames. In either frame loss event, the devices would need to perform additional processing that could lead to connection delays or longer association times.

Embodiments described herein can improve traditional network scanning methods (e.g., for WiFi-6E, etc.) using a variety of methods that can be combined or used independently.

For example, the system can learn the channel list of a 6 GHz radio that have active Basic Service Set Identification (BSSID) services with original scanning in 2.4 and 5 GHz radio. The 6 GHz radio may perform off-channel scanning in these channels instead of performing scanning across all valid 6 GHz channels. This data may be acquired from stored data (e.g., at the AP or AP controller, etc.), including for example, a Reduced Neighbor Report (RNR) Information Element (IE) that includes a neighbor AP's 6 GHz BSSID information. Information associated with an AP's co-hosted 2.4 and 5 GHz radio's beacons or probes may also be included. The channel list may be determined with an original scanning in 2.4 and 5 GHz radio. An additional 6 GHz radio scanning may be implemented off-channel in these channels instead of performing scanning across all valid 6 GHz channels, thereby reducing a number of channels to scan and improving efficiency of the overall system.

Embodiments described herein may also or alternatively include scheduled scanning. For example, a scan period may be scheduled based on information in a Buffer Status Report (BSR) frame received from one or more client devices. From the BSR frames, an AP can learn if a Wi-Fi communication station (STA), such as the AP, a base station, or a mobile device including a Wi-Fi device, has buffered frames and is likely to send uplink data to the AP. If this case, the AP can defer the scan period to subsequent beacon interval. The scan period may last until the AP has received available data from its clients. A similar process may apply to Wi-Fi 6 capable APs operating on 2.4 and 5 GHz channels. The scheduled scanning process may reduce the number of scans in the system, which can reduce extraneous or unneeded data from being needlessly transmitted between devices.

Embodiments described herein may also or alternatively include adjusting BSSID information in beacon frames. For example, client devices may learn about the Short Service Set Identification (Short-SSID) field (e.g., hash of the SSID, compressed SSID, shortened or reduced SSID, etc.) and/or destination address field operating on 6 GHz radio from the RNR IE present in AP's co-hosted 2.4 G and 5 GHz beacon frames and probe frames. Client devices are also likely to send probe request frames to 6 GHz BSSID immediately after processing the RNR IE of co-hosted 2.4 G and 5 GHz radio. If the AP is initiating a scanning process during the same window, it may not be able to respond to probe request frames. This can cause client connectivity issues. To solve this issue, embodiments of the application may not include the 6 GHz BSSID information in the RNR IE of co-hosted 2.4 G and 5 GHz radios in the beacon frames prior to going for off channel scan on 6 GHz radio. As shown, this is because the 2.4 G and 5 GHz beacon frames and probe frames are present and it is not likely that the same device will include 6 GHz as well. This may also limit the requirement of the client to respond to probe request frames, which can reduce a number of tasks that the client needs to perform and improve computational efficiency for other, higher priority tasks.

Embodiments described herein may also or alternatively consider a Target Wait Time (TWT) for AP scanning. For example, TWT may define a time window when the STA is awake and able to transmit or receive data, or when the STA is asleep and unable to transmit or receive data (e.g., when the STA is set to "power-save mode"). In some examples, the AP scanning may be aligned with the TWT window of the STA so that any network scanning may be performed during the scheduled time period that the STA is in power save state. This process may also define scheduled scanning dwell time (e.g., the time the AP spends on a foreign channel while scanning). In some examples, the AP can use individual TWT or broadcast TWT mechanisms to assign the windows when the STAs would remain in power save state. During this time, the STAs are not supposed to send any data to the AP and the AP can use these windows to perform background scanning. Embodiments of the application may adjust the timing of AP scanning (e.g., on 2.4/5/6 GHz channels) to wait until the STA is asleep due to time TWT. This may be implemented either to send individual TWT or broadcast TWT to all the APs associated with the TWT equal to the scan dwell time interval, thereby reducing channel utilization overall. Additionally, a similar process may apply to Wi-Fi 6 capable APs operating on 2.4 and 5 GHz channels.

Technical advantages are realized throughout the application. For example, embodiments described herein can be more efficient than traditional processes, as well as increase the ability to detect neighbors and threats faster than before. This scanning process may also put less impact on access service since fewer channels are required to scan. Additionally, the system described herein may reduce packet loss and retries, which may correspond with a better user experience.

Examples provided in the disclosure recite 2.4 GHz, 5 GHz, and 6 GHz frequency bands, but the concepts described throughout should not be limited to these frequency bands. These bands are provided for illustrative purposes only. For example, some embodiments of the application describe learning a channel list of an unknown frequency band (e.g., 6 GHz) using data from an original scanning process (e.g., 2.4 and 5 GHz). As the Federal Communications Commission (FCC) opens new bands for use, these methods may be applied to the future spectrums and channel lists may be learned on these new bands.

FIG. 1 illustrates an example network scanning scenario, in accordance with embodiments of the application. In the illustration, two APs 110 (shown as first access point 110A and second access point 110B) may perform the network scanning. Although not shown in FIG. 1 for simplicity, APs 110 may include a Physical Layer Device (PHY), a Media Access Control Layer (MAC), a processor, a memory, a network interface, and one or more antennas. The PHY may include one or more transceivers and a baseband processor. The transceivers may be coupled to the antennas to communicate wirelessly with one or more STAs, with one or more other APs (e.g., between first access point 110A and second access point 110B), or with other suitable devices.

APs 110 may be physically co-located using 2.4 and 5 GHz channels and, in some examples, have at least three radios operating in at least three frequency bands (e.g., 2.4 GHz, 5 GHz, and 6 GHz, etc.). Each radio of APs 110 may generate beacon frames during TBTT in the primary channel of its Basic Service Set (BSS). The radios may send the generated beacon frames at TBTT intervals on its primary channel. The beacons of 2.4 and 5 GHz radio also contain information about the 6 GHz BSSID in the form of the Reduced Neighbor Report (RNR) Information Element (IE).

A 6 GHz scanning channel list may be generated based on information from APs 110 co-hosted 2.4 and 5 GHz radio's beacons or probes. For example, in a logical network segment of a Wi-Fi network, a group of co-located wireless network devices like APs 110 may form a service set (e.g., operating with the same Level 2 (L2) networking parameters) when the devices share the same Service Set Identifier (SSID). As part of the Wi-Fi 6E standard, these devices may be required to carry 6 GHz BSSID information in 2.4 and 5 GHzRNR IE of beacon and probe response. The RNR elements may comprise a channel number, operating class, Target Beacon Transmission Time (TBTT) Offset, short SSID, BSSID, and Basic Service Sets (BSS) that aid in the discovery of the co-located 6 GHz BSS.

Using this available information, first AP 110A may determine that its neighbor, second AP 110B, has 6 GHz BSSIDs and may also determine the channel number. Based on this scanned information, first AP 110A may add the channel number associated with second AP 110B to a 6 GHz scan channel list maintained by first AP 110A.

Figure 2:
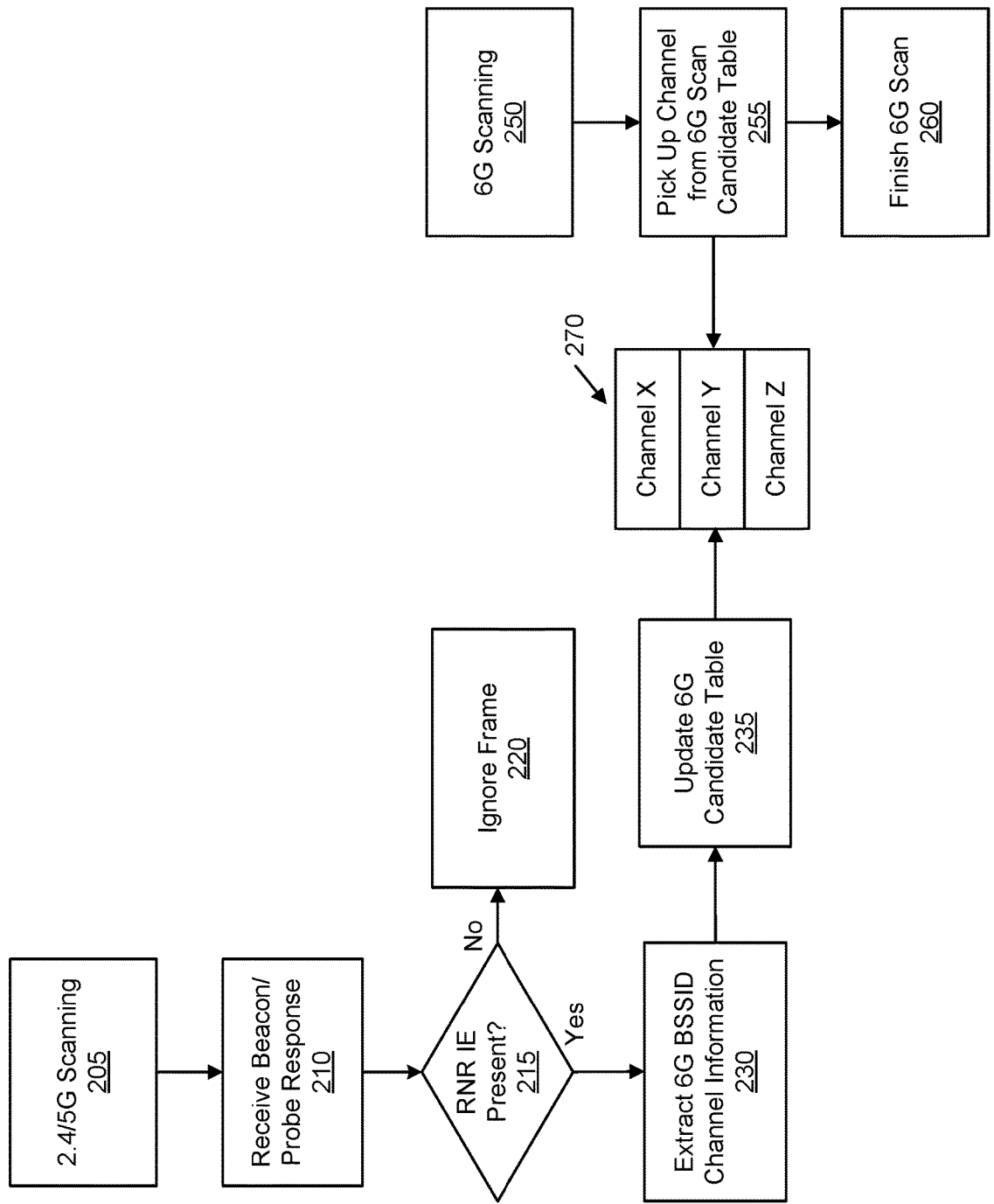
FIG. 2 illustrates a method of network scanning, in accordance with embodiments of the application.

FIG. 2 illustrates a method of network scanning, in accordance with embodiments of the application. The illustrated method may be performed by the AP and/or AP controller.

At block 205, an AP may initiate a 2.4 and 5 GHz scanning process. In the context of the 802.11 standard, management frames supporting the SSID IE include the beacon, probe request/response, and association/reassociation request frames.

For example, an AP may advertise wireless local area networks (WLANs) to STAs by sending out beacons and probe responses that contain a WLAN's Service Set Identifier (SSID), as well as, e.g., supported authentication and data rates. When a STA associates to an AP, that STA sends traffic to the AP's Basic SSID (BSSID), which typically is the AP's Media Access Control (MAC) address. In some networks, an AP may use a unique BSSID for each WLAN allowing a single, physical AP to support multiple WLANs.

At block 210, the AP may receive beacon and probe responses from the 2.4 and 5 GHz scanning process. For example, each beacon or probe response may contain a single SSID IE. The AP may send beacons that it supports at a beacon interval (e.g., 100 ms), using a unique BSSID, and respond to probe requests for supported SSIDs (including a request for the broadcast SSID) with a probe response, including the capabilities corresponding to each BSSID. In one embodiment, an AP may advertise up to a given number (e.g., 16) of beacons, each with a different BSSID.

At block 215, the AP may determine whether the RNR IE is present for the neighboring AP in the 2.4 and 5 GHz scanning process. If yes, the method proceeds to block 230. If no, the method proceeds to block 220.

At block 220, the AP may ignore the frames and move on to parsing the next frame. For example, the frame may be ignored when the frame fails to include the RNR IE.

At block 230, information from the neighbor's beacon or probe response may be extracted and stored. The information may include the neighbor AP's 6 GHz BSSID information. Other frequency bands greater than 2.4 and 5 GHz may be discovered, including but not limited to 6 GHz, without diverting from the essence of this disclosure. Illustrative examples of the 6 GHz BSSID information is provided in FIG. 3.

Figure 3:
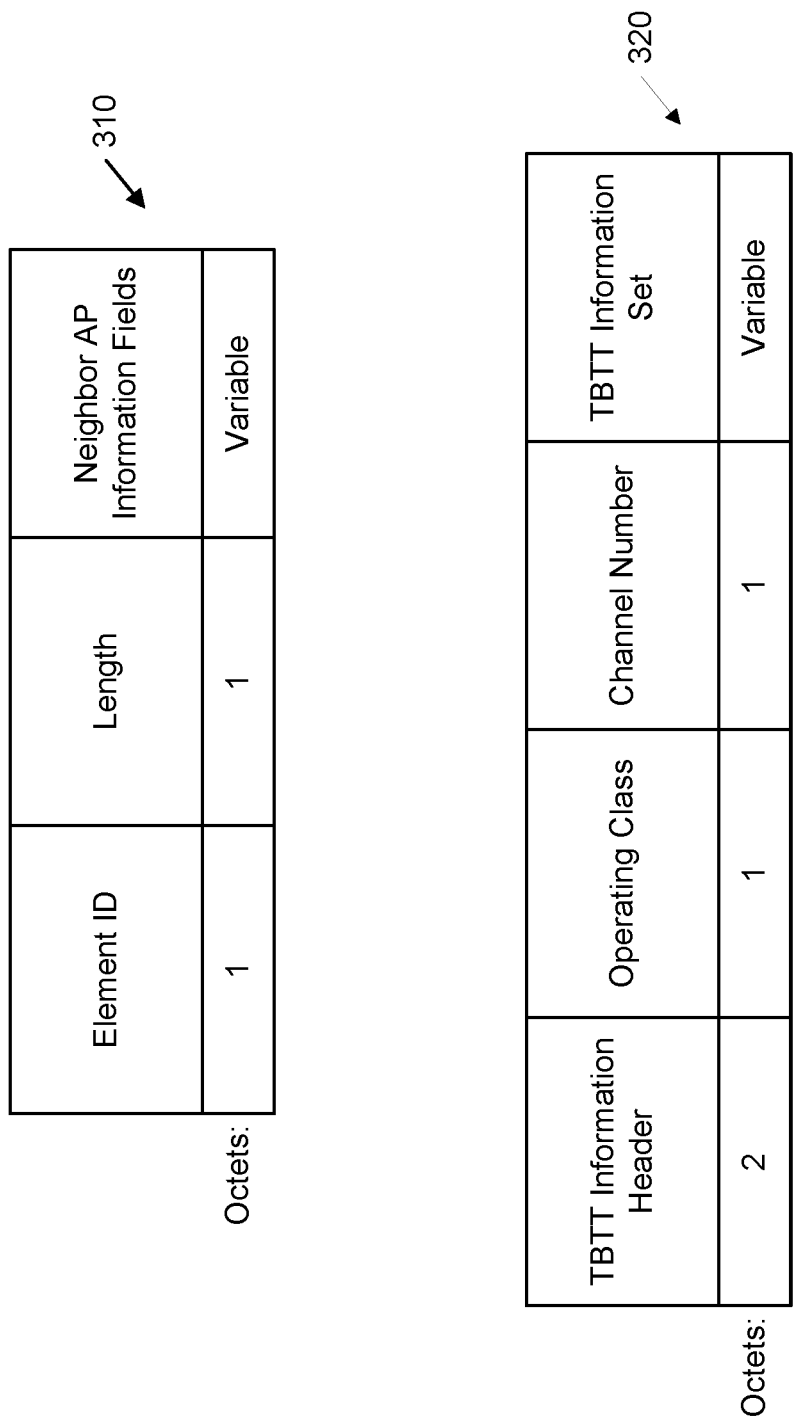
FIG. 3 illustrates some examples of 6 GHz Basic Service Set Identification (BSSID) information, in accordance with embodiments of the application.

FIG. 3 illustrates some examples of 6 GHz Basic Service Set Identification (BSSID) information, in accordance with embodiments of the application. In the illustration, first format 310 may include a RNR element format and second format 320 may include a neighbor AP information field format. In first format 310, the data may comprise one octet of each the element identifier (ID) and length, with a variable octet format of the neighbor AP information. In second format 320, the data may comprise two octets for the Target Beacon Transmission Time (TBTT) information header, one octet for the operating class, one octet for the channel number, and a variable octet format of the TBTT information set. The "operating class" and "channel number" fields may indicate the APs 6 GHz BSSID's operation channel information that is also included in "neighbor AP information field" of first format 310.

Illustrative 6 GHz neighborhood BSSID tables are provided with FIG. 4. For example, the 2.4 and 5 GHz radio scan may produce list of BSSID channels 410. The list may comprise neighboring APs from the scanning AP and each AP's 6 GHz BSSID channel. In some examples, the list of BSSID channels 410 may be transformed to generate a second list 420, corresponding with the 6 GHz channel and an active 6 GHz BSSID number.

The second list 420 may be sorted or weighted to produce a 6 GHz scan candidate table 430. The 6 GHz scan candidate table 430 may include the 6 GHz channel, active 6 GHz BSSID number, index, and/or the scheduling weight associated with the 6 GHz channel.

Various sorting or weighting methodologies are considered. For example, a channel may be prioritized and assigned a greater weight than other channels when the channel includes a greater number of BSSIDs (e.g., column labeled "active 6 GHz BSSID number"). The larger number of BSSIDs may make the channel more discoverable by neighbors and with more active BSSIDs. In another example, the active 6 GHz BSSID number from the second list 420 can be sorted from high to low, and assigned a different scheduling weight according to its order and number. The scheduling weight may correspond with the frequency of the 6 GHz channel being selected to scan. The sorting or weighting process may be implemented using other algorithms without diverting from the essence of the disclosure.

Returning to FIG. 2, at block 235, a 6 GHz scan candidate table 430 may be updated, as shown with FIG. 4. For example, the channel list may be determined with an original scanning in 2.4 and 5 GHz radio, and an additional 6 GHz radio scanning may be implemented off-channel in these channels instead of performing scanning across all valid 6 GHz channels. The combination of channels from these scans may identify channels for 6 GHz scan candidate table 430.

At block 250, 6 GHz scanning may be implemented using the 6 GHz BSSID channel information. For example, the 6 GHz radio may perform off-channel scanning in these channels instead of performing scanning across all valid 6 GHz channels. This data may be acquired from stored data (e.g., at the AP or AP controller, etc.), including for example, a Reduced Neighbor Report (RNR) Information Element (IE) that includes a neighbor AP's 6 GHz BSSID information. Information associated with an AP's co-hosted 2.4 and 5 GHz radio's beacons or probes may also be included.

At block 255, the AP (or other device including the AP controller, etc.) may select a channel from 6 GHz scan candidate table 430.

At block 260, 6 GHz scanning may be completed. The AP may perform a background scanning process on the channel selected from 6 GHz scan candidate table 430. This may comprise switching to that channel and listening for the RF transmissions on that channel.

At block 270, any discovered channels may be stored with 6 GHz scan candidate table 430.

FIG. 5 illustrates a control information subfield format in a Buffer Status Report (BSR) control subfield for implementing a scheduled scan period, in accordance with embodiments of the application. For example, the scan period may be scheduled based on Buffer Status Report (BSR) frames received from the client devices. As described herein, an AP can learn if a Wi-Fi communication station (STA), such as the AP, a base station, or a client device including a Wi-Fi device, has buffered frames (e.g., from the BSR frames) and is likely to send uplink (UL) data to the AP. If this case, the AP can defer the scan period to subsequent beacon interval. The scan period may last until the AP has received available data from its clients. A similar process may apply to Wi-Fi 6 capable APs operating on 2.4 and 5 GHz channels.

An illustrative control information subfield format is provided with FIG. 5. The format may include Access Category Indicator (ACI) bitmap, Delta Traffic Identifier (TID), ACI high, scaling factor, queue size high, and queue size all fields. For example, TID may correspond with a traffic classification indicating the relative priority level of the traffic. In another example, the access category may correspond with data that may be queued together or aggregated according to the priority level.

In some examples, to assist the AP in scheduling uplink (UL) transmission and allocating UL multi-user (MU) resources, an APs may request STA buffer status information. The format of the request may be defined in the IEEE 802.11ax standards. For example, the STA can explicitly deliver Buffer State Reports (BSRs) in any frame sent to the AP. The BSR can be carried in Quality of Service (QoS) Control field (e.g., a 16-bit field that identifies the QoS parameter of a data frame) and/or in the BSR variant of the High Throughput (HT) Control field of the Medium Access Control (MAC) header frame. As such, any client device can indicate its buffer status in the QoS Control field and/or in the HT Control field of the MAC header frame.

From the BSR frames, the AP can determine whether the STA has buffered frames and is likely to send uplink data to the AP. If that case, the AP can defer the scan period to subsequent beacon interval until it has received all the data from its clients. This may also apply to the Wi-Fi 6 capable APs operating on 2.4 and 5 GHz channels.

Figure 6:
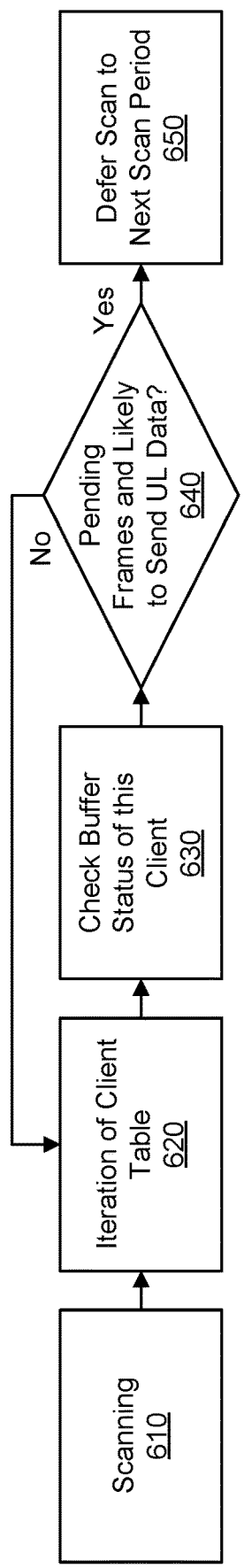
FIG. 6 illustrates a process of deferring a scan to the next scan period, in accordance with embodiments of the application.

FIG. 6 illustrates a process of deferring a scan to the next scan period, in accordance with embodiments of the application.

At block 610, a scanning process may be initiated. The scan process may correspond with the process described with FIG. 2 or any other scan process described throughout the disclosure.

At block 620, a client table may be accessed. In some examples, the client table may correspond with the 6 GHz neighborhood BSSID table illustrated with FIG. 4. An iteration of the client table may be initiated.

At block 630, a buffer status of the client may be checked. For example, a Buffer Status Report (BSR) frame may be received from one or more client devices and identify whether the STA has buffered frames.

At block 640, the process determines whether the buffer has pending frames and is likely to send uplink (UL) data (e.g., from the BSR frame). If yes, the process proceeds to block 650. If no, the process returns to block 620.

At block 650, the scan may be deferred to the next scan period. The scan period may last until the AP has received available data from its clients. A similar process may apply to Wi-Fi 6 capable APs operating on 2.4 and 5 GHz channels.

Figure 7:
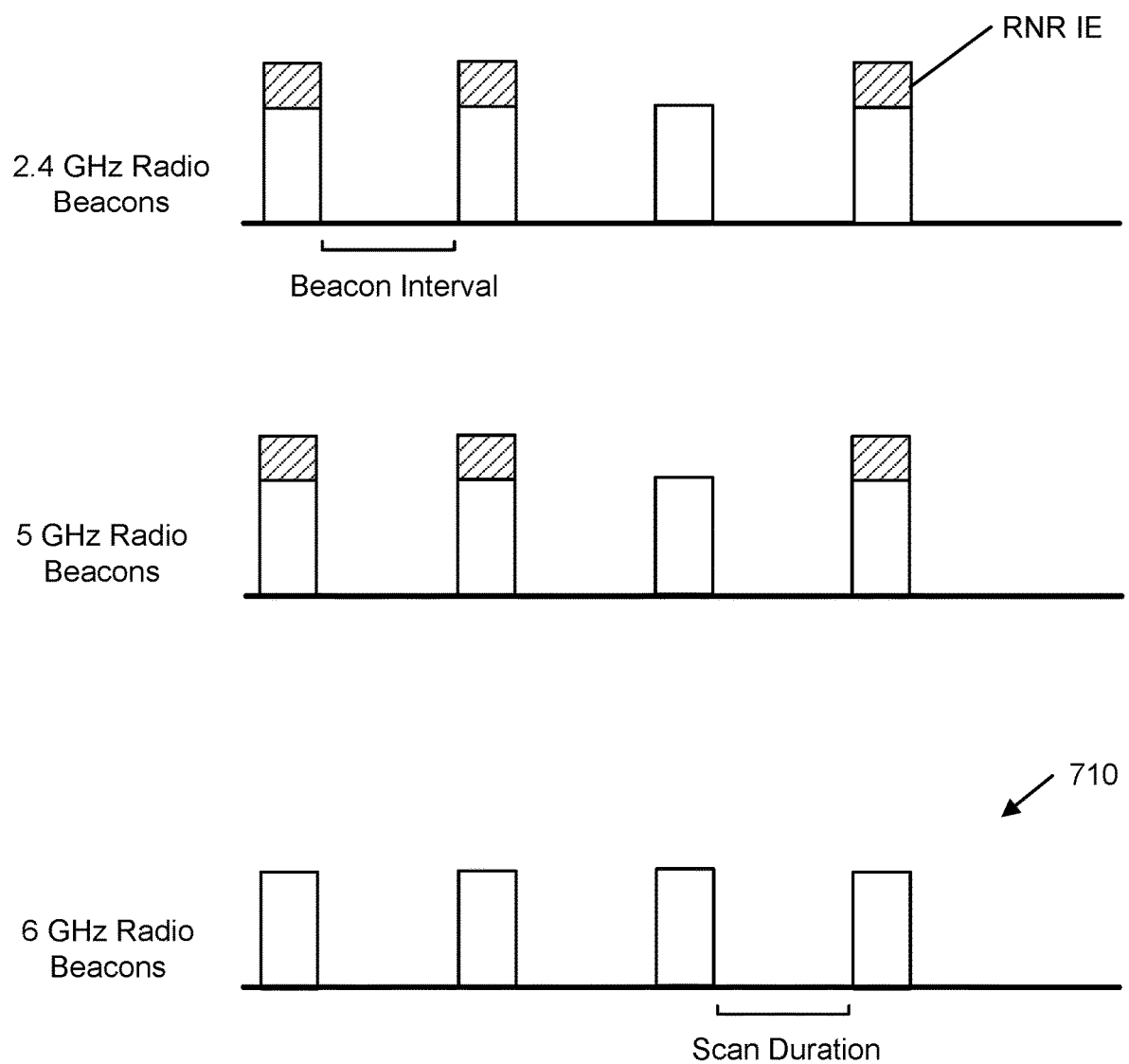
FIG. 7 illustrates background scanning, in accordance with embodiments of the application.

FIG. 7 illustrates background scanning, in accordance with embodiments of the application. For example, before and after going off-channel to scan on the 6 GHz radio, the system may exclude and include the 6 GHz BSSID information in the RNR IE of co-hosted 2.4 and 5 GHz radios in the beacon frames. An additional 6 GHz radio scanning may be implemented off-channel in these channels instead of performing scanning across all valid 6 GHz channels. Additionally, client devices may learn about SSIDs operating on 6 GHz radio from RNR IE present in AP's co-hosted 2.4 and 5 GHz beacons and probe frames. Client devices are likely to send probe request frames to 6 GHz BSSID immediately after processing the RNR IE of co-hosted 2.4 and 5 GHz radio.

As illustrated in FIG. 7, each of the 2.4 GHz radio beacons, 5 GHz radio beacons, and 6 GHz radio beacons transmit four beacons in the network. The first two beacons of the 2.4 and 5 GHz include the RNR IE and the third beacon is aligned with the other radio's scanning window. Because of the alignment, the RNR IE is not needed in the 2.4 and 5 GHz radio beacons.

When the 6 GHz radio initiates the scanning process, 2.4 and 5 GHz radio beacons may stop including the 6 GHz BSSID information in the RNR IE and the client devices may not send probe request frames to 6 GHz radio during the beacon intervals. As shown with the 6 GHz radio beacons 710, the AP starts including 6 GHz BSSID information in the RNR IE of 2.4 and 5 GHz radio beacons after the scan period is over.

Figure 8:
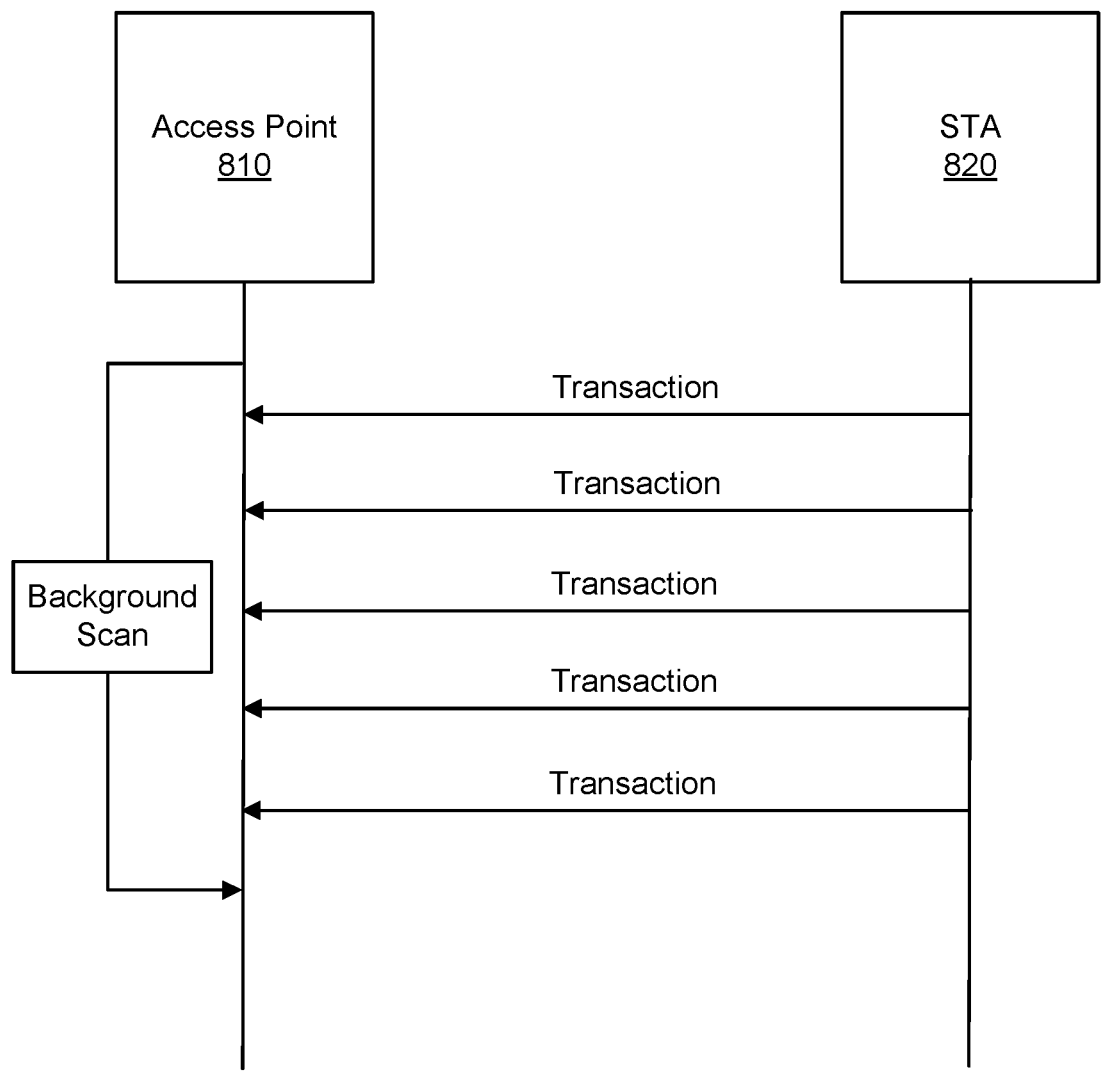
FIGS. 8-9 illustrate scheduling individual or broadcast TWT, in accordance with embodiments of the application.
Figure 9:
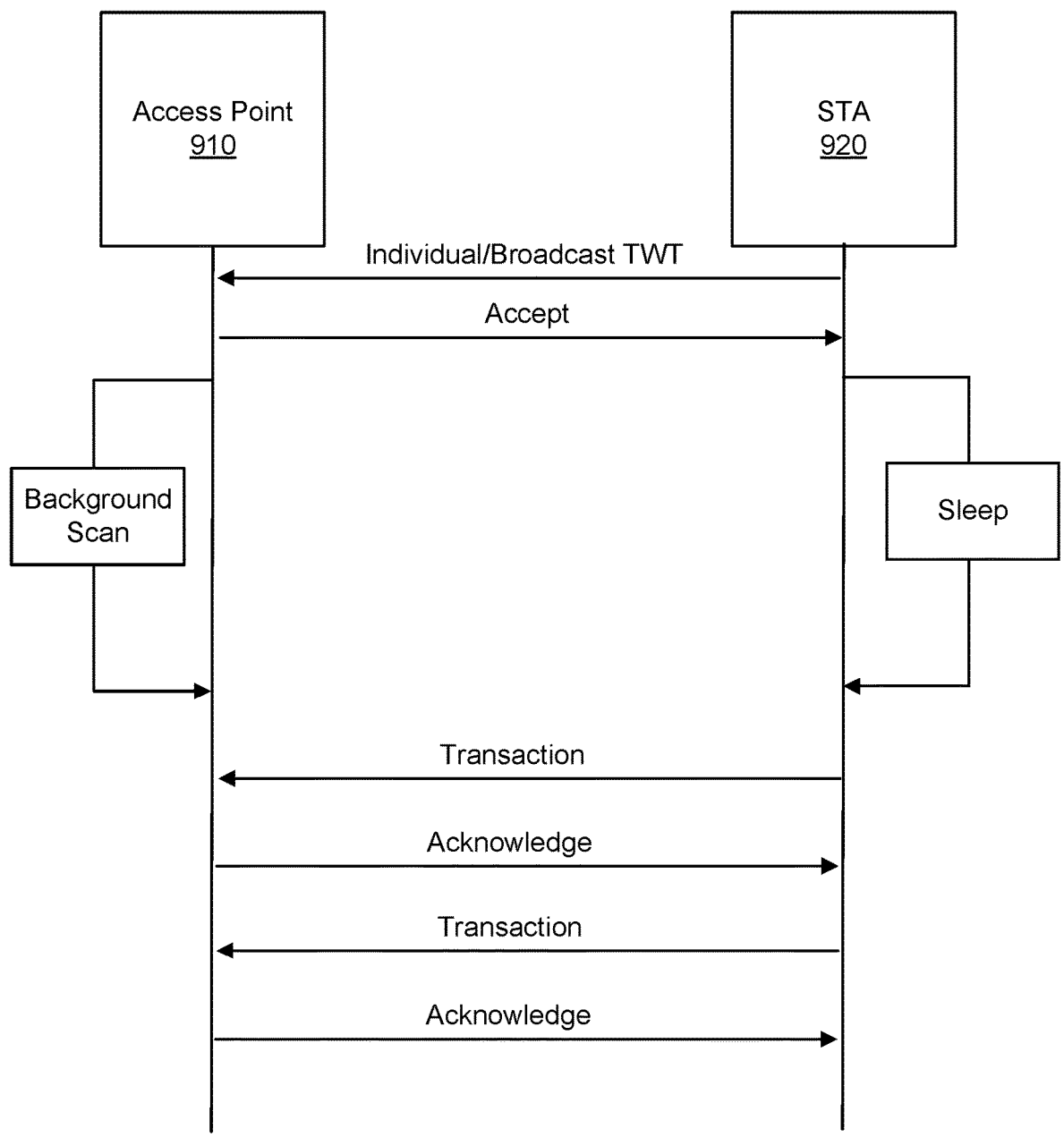

FIGS. 8-9 illustrate scheduling individual or broadcast TWT, in accordance with embodiments of the application. For example, FIG. 8 illustrates a process prior to scheduling individual or broadcast TWT and FIG. 9 illustrates a process after scheduling individual or broadcast TWT.

In FIG. 8, AP 810 starts a background scan. AP 810 may change the operating channel to a desired foreign channel and will not listen for any frame on the home channel. AP 810 may not receive any frame from STA 820 when doing background scan, thus STA 820 may not receive any ACK frame from AP 810. STA 820 may keep retrying the frames until AP 810 returns from the background scan and/or otherwise returns to the home channel.

In FIG. 9, the Individual and Broadcast TWT request may be implemented. For example, before AP 910 begins the background scan on the foreign channel, AP 910 may perform one or more operations. For example, the AP may assign TWT service periods to STAs that are not aligned with AP's scanning window. To achieve this, the AP may assign the Target Wait Times (TWT) greater than or equal to its dwell time. The AP may use individual or broadcast TWT mechanisms to achieve this.

Once STA 920 accepts, STA 920 may sleep for the required duration of the dwell time and/or otherwise not send any frames to AP 910. AP 910 may start in parallel the background scan on the foreign channel for the required dwell time interval. AP 910 may perform the background scan (e.g., of a foreign channel) during the window that STA 920 should not send frames to AP 910 (e.g., data frames, etc.). Once the dwell time interval expires, AP 910 may come back to the home channel and STA 920 can wake up from the sleep time. Normal operation may resume.

In some examples, the scan routine may be initiated periodically. The process may implement implicit TWT. If the scan routine may not be initiated periodically (e.g., a one-time scan), the process may implement explicit TWT.

In some examples, a TWT session may be previously implemented. For an existing TWT session, the process can use the TWT information frame to tune a TWT session parameter to fit the dwell time for the background scan.

Figure 10A:
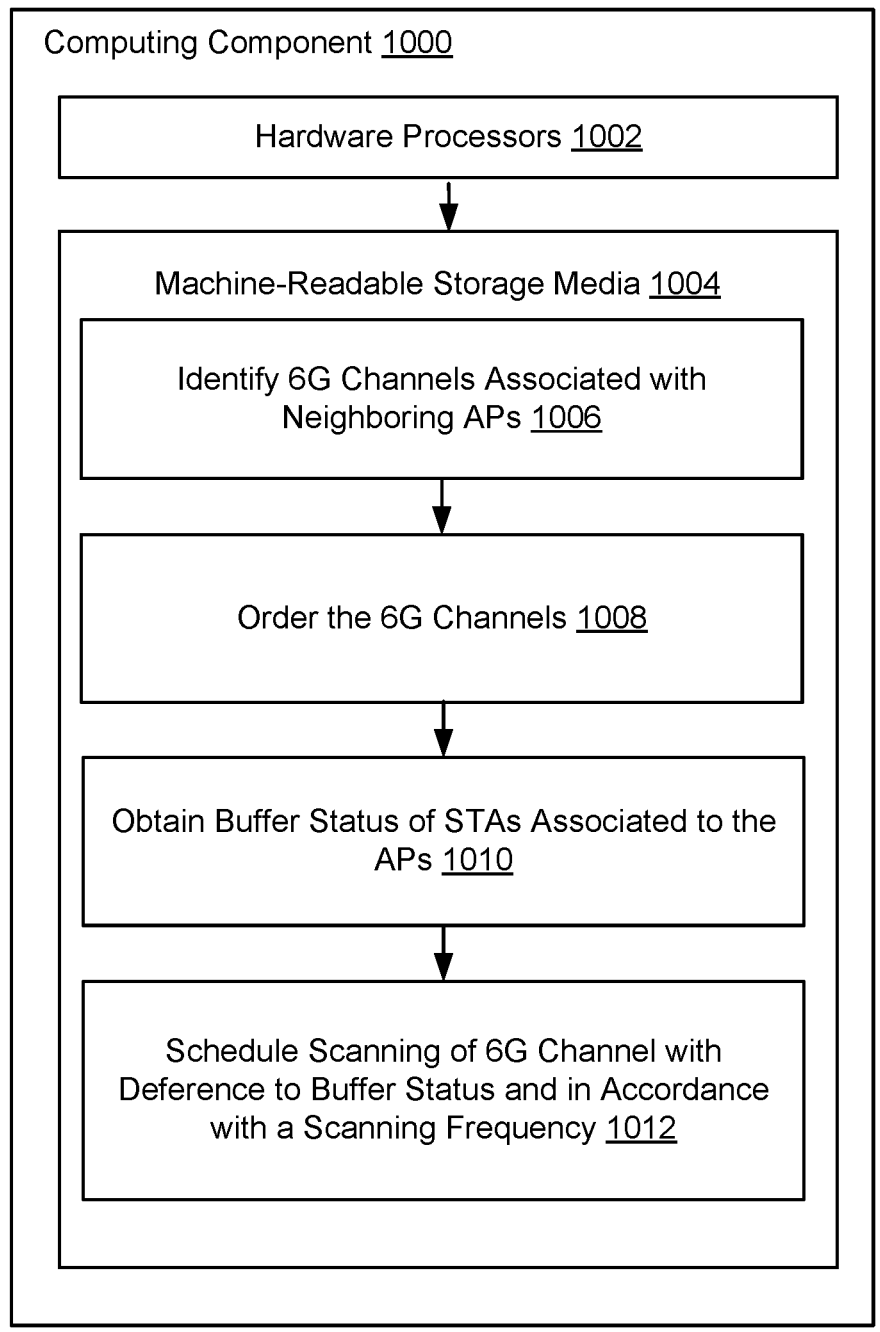
FIGS. 10A-10B illustrate a computing component for providing network scanning, in accordance with embodiments of the application.
Figure 10B:
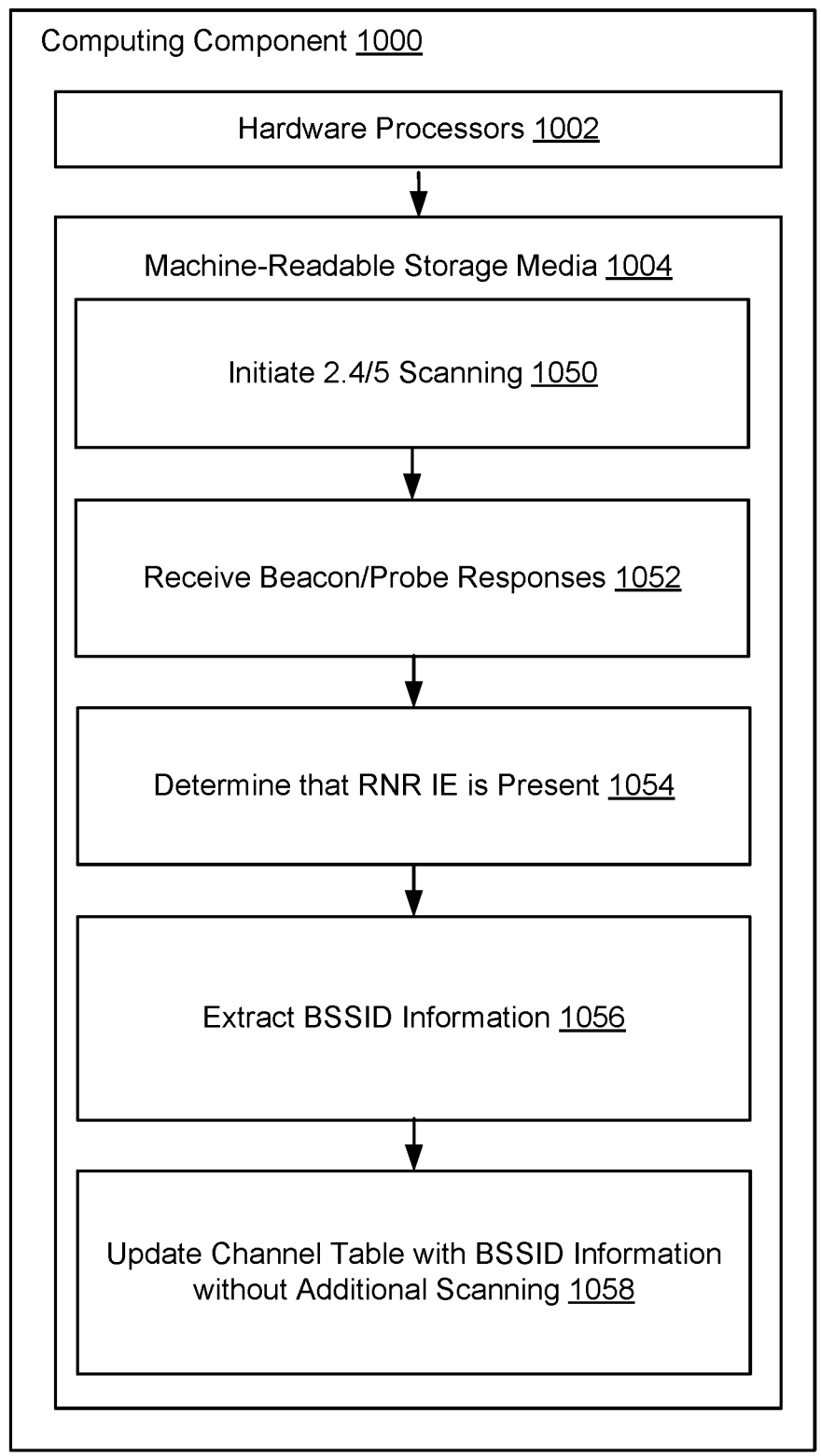

FIGS. 10A-10B illustrate examples iterative processes performed by a computing component 1000 for providing network scanning. Computing component 1000 may be, for example, a server computer, a controller, or any other similar computing component capable of processing data. In the example implementation of FIGS. 10A-10B, the computing component 1000 includes a hardware processor 1002, and machine-readable storage medium 1004. In some embodiments, computing component 1000 may be an embodiment of a system corresponding with first AP 110A or second AP 110B of FIG. 1.

Hardware processor 1002 may be one or more central processing units (CPUs), semiconductor-based microprocessors, and/or other hardware devices suitable for retrieval and execution of instructions stored in machine-readable storage medium 1004. Hardware processor 1002 may fetch, decode, and execute instructions, such as instructions 1006-1012 in FIG. 10A or instructions 1050-1058 in FIG. 10B, to control processes or operations for optimizing the system during run-time. As an alternative or in addition to retrieving and executing instructions, hardware processor 1002 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1004, may be any electronic, magnetic, optical, or other physical storage device that contains or stores executable instructions. Thus, machine-readable storage medium 1004 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1004 may be a non-transitory storage medium, where the term "non-transitory" does not encompass transitory propagating signals. As described in detail below, machine-readable storage medium 1004 may be encoded with executable instructions, for example, instructions 1006-1012 in FIG. 10A or instructions 1050-1058 in FIG. 10B.

Hardware processor 1002 may execute instruction 1006 to identify 6 Gigahertz (6 GHz) channels associated with neighboring APs.

Hardware processor 1002 may execute instruction 1008 to order the 6 GHz channels of the neighboring APs based on activity level of the 6 GHz channels.

Hardware processor 1002 may execute instruction 1010 to obtain buffer status of a Wi-Fi communication station (STA) associated to the AP.

Hardware processor 1002 may execute instruction 1012 to schedule scanning of one or more of identified 6 GHz channels with deference to the obtained buffer status of the STAs and in accordance with a scanning frequency dependent upon the order of the 6 GHz channels.

In some examples, the 6 GHz channels associated with neighboring APs are identified from a Reduced Neighbor Report (RNR) Information Element (IE) that includes a neighbor AP's 6 GHz BSSID information. In some examples, the neighbor AP's 6 GHz BSSID information is extracted from beacon frames received in 2.4 GHz and/or 5 GHz frequency bands.

In some examples, the hardware processor 1002 may execute an instruction to, prior to scanning one or more of identified 6 GHz channels, prevent the inclusion of the RNR IE that that includes the neighbor AP's 6 GHz BSSID information in corresponding 2.4 and 5 GHz beacon frames.

In some examples, the obtained buffer status of the STAs associated to the AP is based on information in a Buffer Status Report (BSR) frame.

In some examples, the hardware processor 1002 may execute an instruction to defer a scan period to a subsequent beacon interval based on a likelihood that a client device associated to the AP is likely to send uplink data to the AP and stop the defer upon receiving the uplink data from the client device and initiation of the subsequent beacon interval. The likelihood may be determined using buffer status information.

In some examples, the scanning frequency depends on a Target Wait Time (TWT) window of the STA being awake and able to transmit or receive data.

In some examples, the AP uses individual Target Wait Time (TWT) or broadcast TWT mechanisms to align a scanning window of the APs to a power save state of the STA.

Computing component 1000 may also be configured to execute instructions illustrated in FIG. 10B. As described in detail below, machine-readable storage medium 1004 may be encoded with executable instructions, for example, instructions 1050-1058.

Hardware processor 1002 may execute instruction 1050 to initiate a scanning process. For example, a 2.4 or 5 Gigahertz (GHz) channel scanning process may be initiated associated with neighboring APs.

Hardware processor 1002 may execute instruction 1052 to receive beacon and/or probe responses. For example, beacon and/or probe responses may be received from the 2.4 GHz and 5 GHz channel scanning process.

Hardware processor 1002 may execute instruction 1054 to determine that a Reduced Neighbor Report (RNR) Information Element (IE) is present. For example, RNR IE may be present for the neighboring APs in the 2.4 GHz and 5 GHz scanning process. The RNR IE may include BSSID information of an AP of the neighboring APs for a channel other than 2.4 GHz and 5 GHz.

Hardware processor 1002 may execute instruction 1056 to extract the BSSID information. For example, the BSSID information may be extracted for the channel other than 2.4 GHz and 5 GHz.

Hardware processor 1002 may execute instruction 1058 to update a channel table with the BSSID information without scanning across all valid channels other than 2.4 GHz and 5 GHz.

In some examples, hardware processor 1002 may execute an instruction to receive a second beacon or probe response, determine that the RNR IE is not present, and ignore the second beacon or probe response.

In some examples, a second channel scanning process of the channel other than 2.4 GHz and 5 GHz is initiated off-channel.

In some examples, the BSSID information is extracted from at least some of the beacon responses received in 2.4 GHz and/or 5 GHz frequency bands.

In some examples, hardware processor 1002 may execute an instruction to obtain a buffer status of an STA associated to the neighboring APs based on information in a Buffer Status Report (BSR) frame.

In some examples, the hardware processor 1002 may execute an instruction to defer a scan period to a subsequent beacon interval based on a likelihood that a client device associated to the AP is likely to send uplink data to the AP and stop the defer upon receiving the uplink data from the client device and initiation of the subsequent beacon interval. The likelihood may be determined using buffer status information.

In some examples, the hardware processor 1002 may execute an instruction to consider a Target Wait Time (TWT) window of the STA being awake and able to transmit or receive data.

Figure 11:
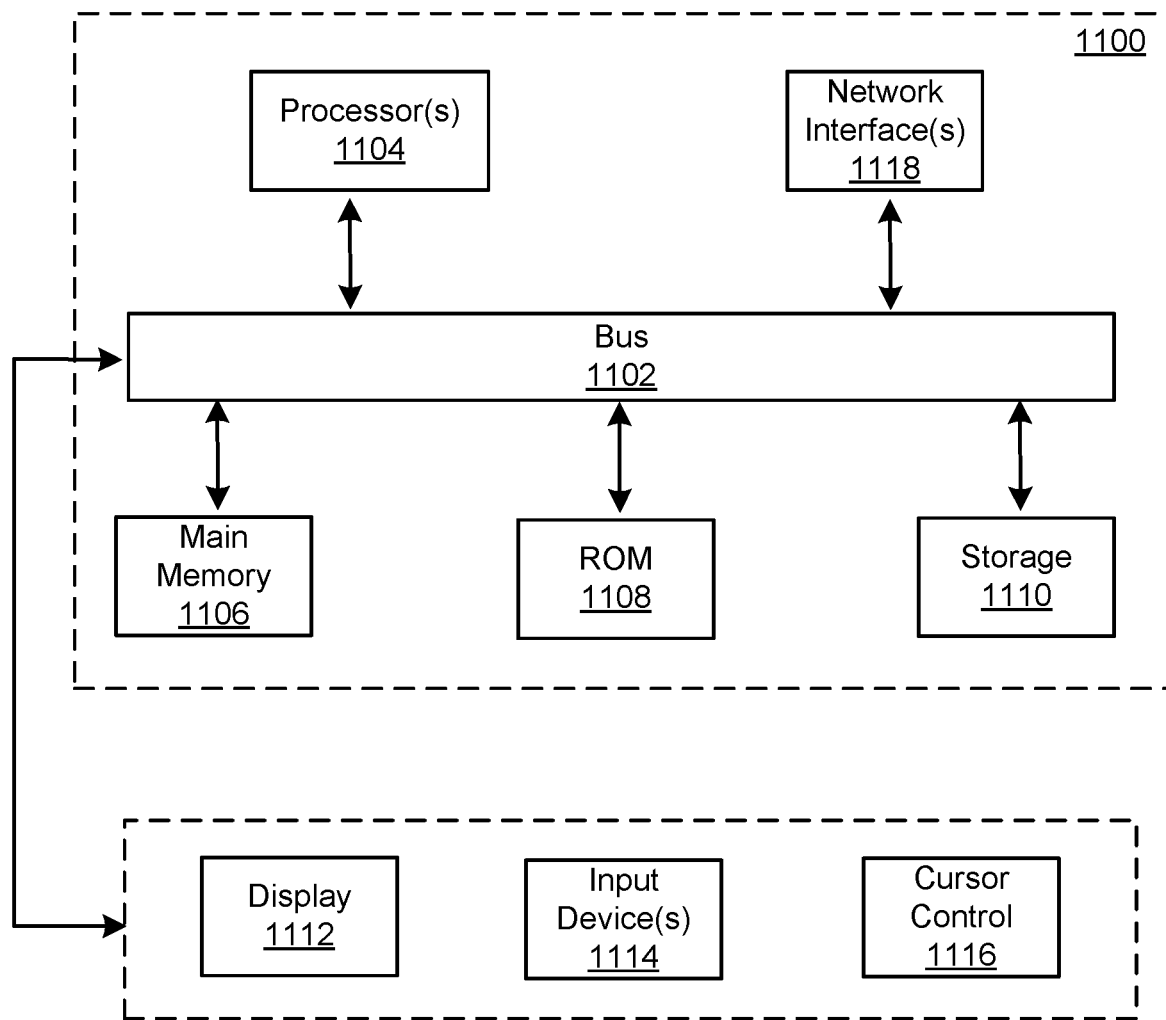
FIG. 11 is an example computing component that may be used to implement various features of embodiments described in the present disclosure.

FIG. 11 depicts a block diagram of an example computer system 1100 in which various of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Communication interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An access point (AP), comprising:
   a processor; and
   a memory unit including computer code that when executed causes the processor to:
   identify 6 Gigahertz (GHz) channels associated with neighboring APs;
   order the 6 GHz channels of the neighboring APs based on activity level of the 6 GHz channels;
   obtain buffer status of a Wi-Fi communication station (STA) associated to the AP; and
   schedule scanning of one or more of identified 6 GHz channels with deference to the obtained buffer status of the STAs and in accordance with a scanning frequency dependent upon the order of the 6 GHz channels.

2. The access point (AP) of claim 1, wherein the 6 GHz channels associated with neighboring APs are identified from a Reduced Neighbor Report (RNR) Information Element (IE) that includes a neighbor AP's 6 GHz BSSID information.

3. The access point (AP) of claim 2, wherein the neighbor AP's 6 GHz BSSID information is extracted from beacon frames received in 2.4 GHz and/or 5 GHz frequency bands.

4. The access point (AP) of claim 2, wherein the computer code further causes the processor to:
   prior to scanning one or more of identified 6 GHz channels, preventing inclusion of the RNR IE that that includes the AP's 6 GHz BSSID information in corresponding 2.4 and 5 GHz beacon frames.

5. The access point (AP) of claim 1, wherein the obtained buffer status of the STAs associated to the AP is based on information in a Buffer Status Report (BSR) frame.

6. The access point (AP) of claim 1, wherein the computer code further causes the processor to:
   defer a scan period to a subsequent beacon interval based on a likelihood that a client device associated to the AP is likely to send uplink data to the AP, wherein the likelihood is determined using buffer status information; and
   stop the defer upon receiving the uplink data from the client device and initiation of the subsequent beacon interval.

7. The access point (AP) of claim 1, wherein the scanning frequency depends on a Target Wait Time (TWT) window of the STA being awake and able to transmit or receive data.

8. The access point (AP) of claim 1, wherein the AP uses individual Target Wait Time (TWT) or broadcast TWT mechanisms to align a scanning window of the APs to a power save state of the STA.

9. A computer-implemented method comprising:
   initiating a 2.4 or 5 Gigahertz (GHz) channel scanning process associated with neighboring APs;
   receiving beacon and probe responses from the 2.4 GHz and 5 GHz channel scanning process;
   determining that a Reduced Neighbor Report (RNR) Information Element (IE) is present for the neighboring APs in the 2.4 GHz and 5 GHz scanning process, wherein the RNR IE includes BSSID information of an AP of the neighboring APs for a channel other than 2.4 GHz and 5 GHz;
   extracting the BSSID information for the channel other than 2.4 GHz and 5 GHz; and
   updating a channel table with the BSSID information without scanning across all valid channels other than 2.4 GHz and 5 GHz.

10. The computer-implemented method of claim 9, further comprising:
- receiving a second beacon or probe response;
- determining that the RNR IE is not present; and
- ignoring the second beacon or probe response.

11. The computer-implemented method of claim 9, wherein a second channel scanning process of the channel other than 2.4 GHz and 5 GHz is initiated off-channel.

12. The computer-implemented method of claim 9, wherein the BSSID information is extracted from at least some of the beacon responses received in 2.4 GHz and/or 5 GHz frequency bands.

13. The computer-implemented method of claim 9, further comprising:
- obtaining a buffer status of an STA associated to the neighboring APs based on information in a Buffer Status Report (BSR) frame.

14. The computer-implemented method of claim 9, further comprising:
- deferring a scan period to a subsequent beacon interval based on a likelihood that a client device associated to the AP of the neighboring APs is likely to send uplink data to the AP, wherein the likelihood is determined using buffer status information; and
- stopping the defer upon receiving the uplink data from the client device and initiation of the subsequent beacon interval.

15. The computer-implemented method of claim 9, further comprising:
- considering a Target Wait Time (TWT) window of the STA being awake and able to transmit or receive data.

16. A non-transitory computer-readable storage medium storing a plurality of instructions executable by one or more processors, the plurality of instructions when executed by the one or more processors cause the one or more processors to:
- initiate a 2.4 or 5 Gigahertz (GHz) channel scanning process associated with neighboring APs;
- receive beacon and probe responses from the 2.4 GHz and 5 GHz channel scanning process;
- determine that a Reduced Neighbor Report (RNR) Information Element (IE) is present for the neighboring APs in the 2.4 GHz and 5 GHz scanning process, wherein the RNR IE includes BSSID information of an AP of the neighboring APs for a channel other than 2.4 GHz and 5 GHz;
- extract the BSSID information for the channel other than 2.4 GHz and 5 GHz; and
- update a channel table with the BSSID information without scanning across all valid channels other than 2.4 GHz and 5 GHz.

17. The non-transitory computer-readable storage medium of claim 16, wherein the plurality of instructions further cause the one or more processors to:
- receive a second beacon or probe response;
- determine that the RNR IE is not present; and
- ignore the second beacon or probe response.

18. The non-transitory computer-readable storage medium of claim 16, wherein a second channel scanning process of the channel other than 2.4 GHz and 5 GHz is initiated off-channel.

19. The non-transitory computer-readable storage medium of claim 16, wherein the plurality of instructions further cause the one or more processors to:
- obtain a buffer status of an STA associated to the neighboring APs based on information in a Buffer Status Report (BSR) frame.

20. The non-transitory computer-readable storage medium of claim 16, wherein the plurality of instructions further cause the one or more processors to:
- defer a scan period to a subsequent beacon interval based on a likelihood that a client device associated to the AP of the neighboring APs is likely to send uplink data to the AP, wherein the likelihood is determined using buffer status information; and
- stop the defer upon receiving the uplink data from the client device and initiation of the subsequent beacon interval.

* * * * *